Feb. 9, 1932.      C. DAVIDSON      1,844,746
TRIP PAN FOR WOLF TRAPS
Filed March 27, 1928
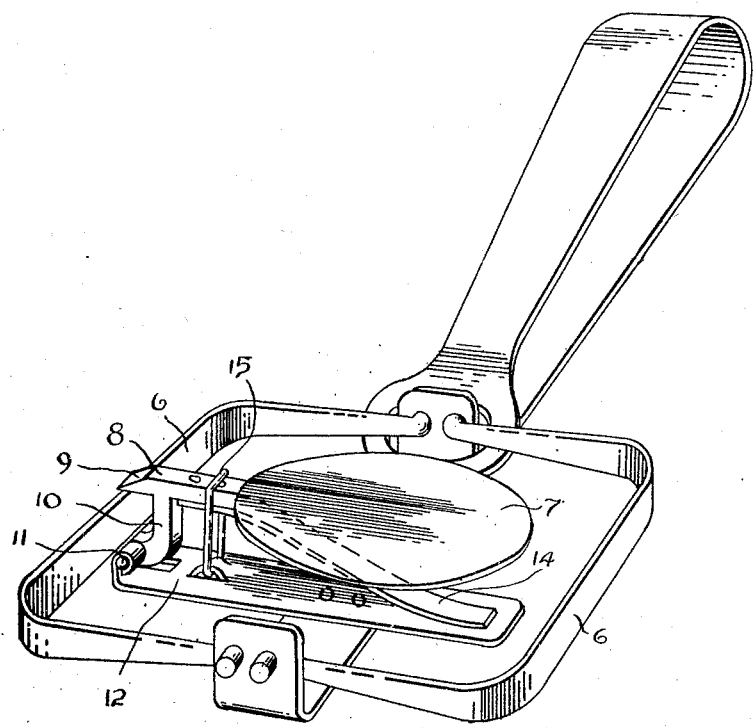
INVENTOR
Cecil Davidson
By
Ralph Burch
Attorney Patented Feb. 9, 1932

1,844,746

UNITED STATES PATENT OFFICE

CECIL DAVIDSON, OF ALLIANCE, ALBERTA, CANADA

TRIP PAN FOR WOLF TRAPS

Application filed March 27, 1928. Serial No. 265,197.

This invention relates to new and useful improvements in traps and more particularly to the construction and arrangement of the trip-pan thereof.

An object of this invention is to produce a trap having a trip-pan which directly engages the jaws and is effected to normal, set position by a tension spring which prevents disengagement and consequent, premature discharge of the trap through slight or accidental movement, thus rendering the trap more positive in action.

A further object is to provide a trap of the character described, having a spring-tensioned trip-pan with an integral arm to directly engage the jaw, this arm having its upper end beveled so that the jaw will pass thereby and be automatically set when pressed down with a stick or like instrument in the hands of the operator.

Further objects and many of the attendant advantages will be readily appreciated as the invention becomes better understood from a consideration of the illustrative embodiment of the same and for which purpose such descriptive drawing has been hereto appended, wherein:

The perspective view shows a trap embodying the principles of the invention.

Referring more in detail to the drawing in which similar reference numerals designate corresponding parts throughout the several views.

It will be seen that the trap is provided with spring-operated jaws 6 and a co-acting trip-pan 7. This trip-pan has a laterally extending arm 8 disposed so that its extremity will directly engage over one of the jaws 6, which extremity has its upper plane substantially beveled as at 9. An integral leg 10 depends from arm 8 at a point removed from the extremity thereof and is suitably pivoted as at 11 to the base plate 12 or the like, thus the trip-pan is hinged. A spring 14 is disposed between arm 8 and the base plate 12 in a manner to affect the trip-pan 7 and normally maintain it in elevated set position, which position is governed by a link 15 mounted over and around arm 8 and pivotally connected to the base-plate 12.

In operation, it will be seen that the only movement required is to press the jaw 6 down with some suitable instrument so that it is forced past the beveled extremity 9 of the trip-arm 8 which is returned to normal position together with the trip-pan 7 by the tension of spring 14, thus the arm will automatically engage over the jaw 6 in a manner to hold it set until released by pressure upon the trip-pan.

It will be obvious from the foregoing description that this invention is a great improvement in traps and while the preferred embodiments have been disclosed yet it is to be understood that minor details in the construction and arrangement may be resorted to within the scope of what is claimed without departing from the spirit of the invention.

What I claim:

An animal trap comprising spring-operated jaws, a trip pan, an arm integral with and extending laterally from said pan, the free end of said arm being adapted to directly engage over one of said jaws when opened, the upper portion of said end being beveled, a leg integral with said arm and depending therefrom at a point remote from the free end thereof, a base plate, said leg having its end pivotally connected to said base plate, a flat spring disposed between said arm and base plate, normally urging said trip pan upwardly and a link pivotally connected with said base plate adapted to extend over and around said arm at a point between said trip pan and leg, said link being adjustable along said arm to limit the upward movement of said trip pan.

In testimony whereof I affix my signature.

CECIL DAVIDSON.